United States Patent [19]

McCartney et al.

[11] Patent Number: 4,469,765

[45] Date of Patent: Sep. 4, 1984

[54] SHOCK ABSORBING BATTERY HOUSING

[75] Inventors: William J. McCartney, Sunrise; Jerome D. Jacobs, Ft. Lauderdale; Mitchel J. Keil, Margate, all of Fla.

[73] Assignee: Motorola, Inc., Schaumburg, Ill.

[21] Appl. No.: 472,355

[22] Filed: Mar. 4, 1983

[51] Int. Cl.³ ............................................. H01M 2/10
[52] U.S. Cl. .................................... 429/123; 429/163
[58] Field of Search ................. 429/123, 163, 96–100; 307/150; 339/65, 88 R, 127 R; 403/349

[56] References Cited

U.S. PATENT DOCUMENTS

| | | | |
|---|---|---|---|
| 3,796,984 | 3/1974 | Selinko | 339/88 R |
| 3,855,534 | 12/1974 | Holcomb et al. | 429/98 X |
| 3,864,172 | 2/1975 | Marks | 429/123 X |
| 3,969,796 | 7/1976 | Hodsdon et al. | 339/91 R X |
| 4,057,757 | 11/1977 | Darden, Jr. | 455/90 |
| 4,214,197 | 7/1980 | Mann et al. | 320/2 |
| 4,429,025 | 1/1984 | Stow | 429/97 |

*Primary Examiner*—Anthony Skapars
*Attorney, Agent, or Firm*—Joseph T. Downey; Edward M. Roney; James W. Gillman

[57] ABSTRACT

A portable battery device is provided which dampens shock incident upon the battery device such that an electrical energizable apparatus connected to the battery device is subject to reduced shock whenever the battery device receives an impact. The battery device includes a battery housing of resilient shock absorbing material injection molded around an interconnecting structure which mechanically and electrically interconnects the battery housing to an electrically energizable apparatus.

17 Claims, 8 Drawing Figures

SHOCK ABSORBING BATTERY HOUSING

BACKGROUND OF THE INVENTION

This invention relates to battery housings and, more particularly to battery housings which when attached to an electrically energizable apparatus such as a portable radio, are capable of reducing shock to such apparatus when the apparatus is dropped.

DESCRIPTION OF THE PRIOR ART

A conventional battery for use in a portable radio is often attached to the lower portion of the radio in a fashion whereby it becomes a part of the overall radio structure. Conventional battery housings attached in this manner are typically formed entirely of high impact materials such as polycarbonate. Although such high impact material battery housings exhibit substantial structural integrity when the battery housing is dropped, unfortunately high amounts of shock are transmitted to batteries situated within the battery housing and to the electrical components of a radio attached to the battery housing. Thus, although the battery housing itself may survive a drop onto a solid surface, the batteries inside the battery housing and/or the radio attached thereto are often damaged by shock transmitted through the conventional high impact material battery housing.

It is one object of the present invention to provide a battery housing which reduces the amount of shock transmitted to a battery situated therein and to an electrically energizable apparatus removably attached to the battery housing.

Another object of the present invention is to reduce shock related deficiencies inherent in conventional battery housings.

These and other objects of the present invention will become apparent to those skilled in the art upon consideration of the following description of the invention.

BRIEF SUMMARY OF THE INVENTION

The present invention is directed to providing a portable battery device which when connected an electrically energizable apparatus reduces the shock to which such apparatus is subjected when dropped.

In accordance with one embodiment of the invention, a portable battery device includes a housing of resilient material for containing at least one electrical energy cell therein. An interconnecting structure of rigid material is situated substantially within and extending without the housing to provide for mechanical connection of the housing to an electrically energizable apparatus. Appropriate electrical contacts are operatively coupled to at least one electrical energy cell and are situated on the interconnecting structure in such a manner as to provide electrical coupling of the at least one energy cell to the electrically energizable apparatus. The portable battery device absorbs shock in a non-destructive manner when subjected to impact. The features of the invention believed to be novel are set forth with particularity in the appended claims. The invention itself, however, both as to organization and method of operation, together with further objects and advantages thereof, may best be understood with reference to the following description taken in conjunction with the accompanying drawings.

DETAILED DESCRIPTION OF THE PREFERRED EMBODIMENT

Figure 1:
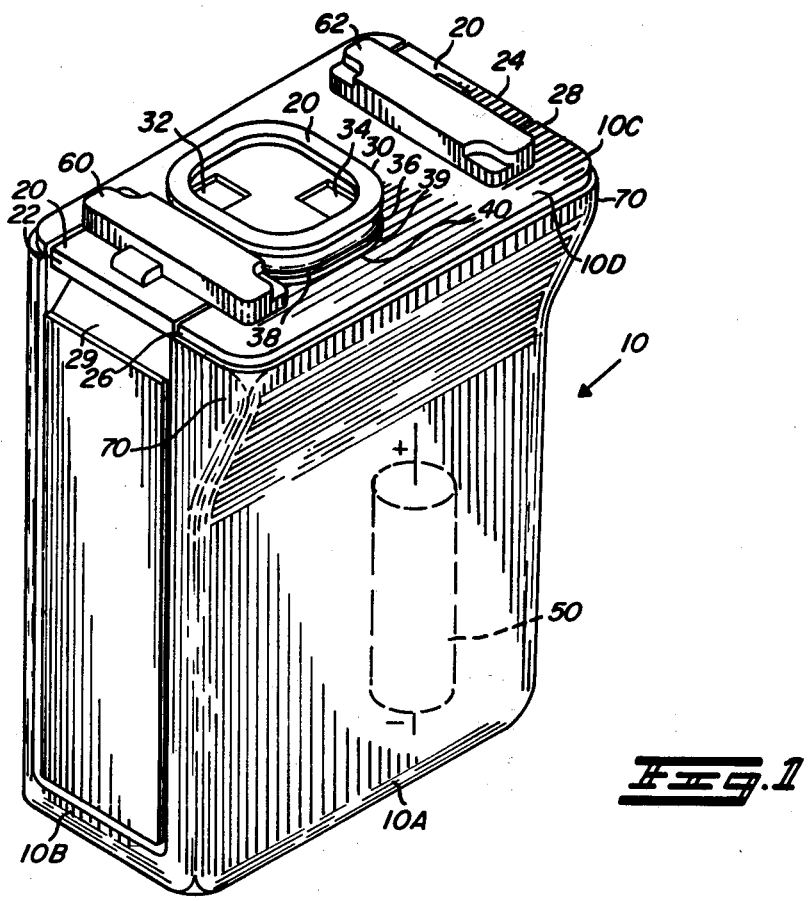
FIG. 1 is a perspective view of the battery device of the present invention.

FIG. 1 illustrates one embodiment of the portable battery device of the present invention. The battery device of FIG. 1 includes a battery housing 10 which in this embodiment exhibits a substantially rectangular geometry. Housing 10 includes a front surface 10A, side surfaces 10B and 10C, and top surface 10D all as shown in FIG. 1. Battery housing 10 is comprised of a resilient material, for example, an elastomeric material such as elastomeric polyurethane.

The battery device includes an interconnecting structure 20. Interconnecting structure 20 is shown in detail in FIGS. 4 and 5 and will be described in detail under the later discussion of such Figures. However, briefly, interconnecting structure 20 includes tabs 22 and 24 extending respectively through apertures 26 and 28 from within battery housing 10 to without battery housing 10 as shown in FIG. 1. Wedge shaped open regions 29 are situated in housing 10 below tabs 22 and 24, respectively such that clamping devices or other mechanical latching apparatus situated on an electrically energizable apparatus appropriately engage tabs 22 and 24 to hold the battery of FIG. 1 to the electrically energizable apparatus.

Interconnecting structure 20 includes a protruding portion 30 situated within an aperture 40 in battery housing 10. Electrical contacts 32 and 34 are situated on protruding portion 30 as shown in FIG. 1. Battery contacts 32 and 34 are respectively coupled to the positive and negative electrodes of electrical energy cells within battery housing 10 such as cell 50 shown in dotted line form within the portable battery devide of FIG. 1. Contacts 32 and 34 are situated on a surface of protruding portion 30 which is recessed within protruding portion 30. An "O" ring type gasket 36 is situated within a groove 38 which is located in the side surface 39 of protruding portion 30. Side surface 39 with groove 38 situated therein is defined as the entire side periphery of protruding portion 30. "O" ring type gasket 36 acts as a water seal when the battery device of FIG. 1 is appropriately mated with an electrically energizable apparatus as discussed later in detail.

Guide members 60 and 62 are situated on upper surface 10D adjacent tabs 22 and 24, respectively. Guides 60 and 62 are comprised of a soft material such as a soft polyurethane material exhibiting a durometer of approximately Shore 55 D, for example in one embodiment. Elastomeric materials are suitable for guides 60 and 62. Guides 60 and 62 are formed from a material which is sufficiently soft such that guides 60 and 62 act as springs when tabs 22 and 24 are held to an electrically energizable apparatus in a manner described later in more detail. Guides 60 and 62 are conveniently formed of the same relatively soft material as employed for battery housing 10.

Battery housing 10 is shaped to be larger at the top thereof than at the bottom thereof in one embodiment of the invention. This is done such that upper surface 10C exhibits approximately the same size and geometry as the lower surface of an electrically energizable apparatus to be mechanically and electrically coupled to the portable battery device of FIG. 1. Thus, in the embodiment of the invention shown in FIG. 1, battery housing 10 exhibits an overhanging portion 70.

Figure 4:
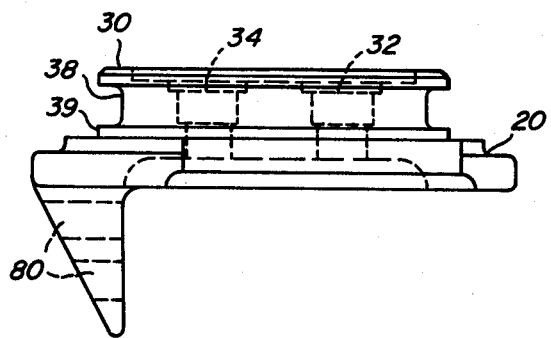
FIG. 4 is a side view of the rigid interconnecting structure of the battery device of FIG. 1.
Figure 5:
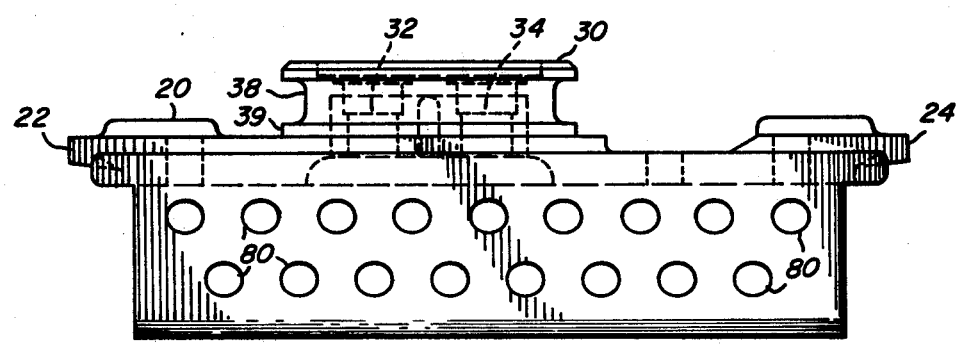
FIG. 5 is a front view of the rigid interconnecting structure of the battery device of FIG. 1.
Figure 6:
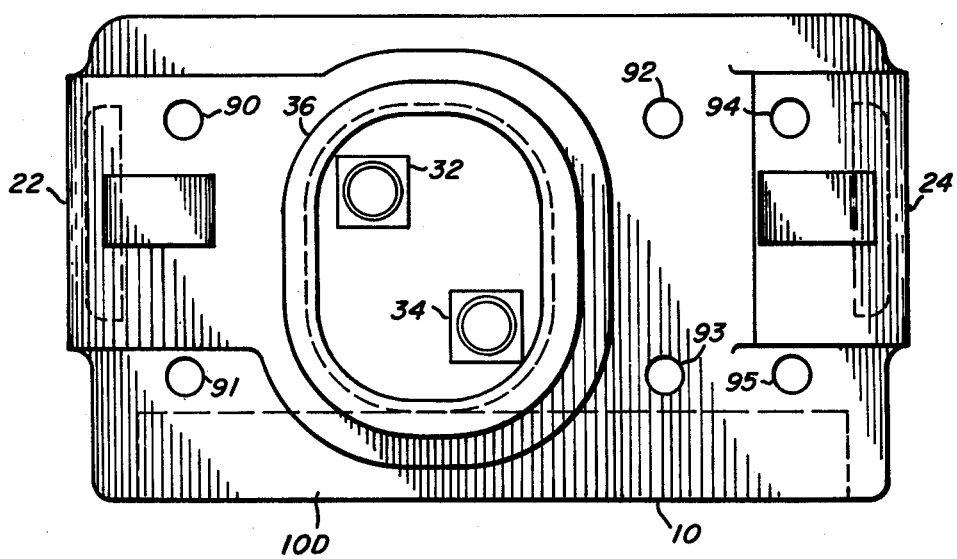
FIG. 6 is a top view of the rigid interconnecting structure of the battery device of FIG. 1.

At this point, it is helpful to briefly examine the procedure for assembling the portable battery device of the present invention. A two shot molding process is employed to form the portable battery device. More specifically, the interconnecting structure 20 shown in FIGS. 4, 5 and 6 is formed by an operation referred to a first shot molding in which interconnecting structure 20 is injection molded from rigid, relatively high durometer material by employing an appropriate die. In a second shot molding step, housing 10 of relatively low durometer material is injection molded around interconnecting structure 20 such that interconnecting structure 20 is substantially encapsulated thereby. This second shot injection molding step results in the formation of apertures 26, 28, and 40 are formed in housing 10 through which tab 22, 24, and protruding portion 30 extend, respectively. In this second shot injection molding step, battery housing 10 is formed including guide members 60 and 62 situated thereon.

Figure 2:
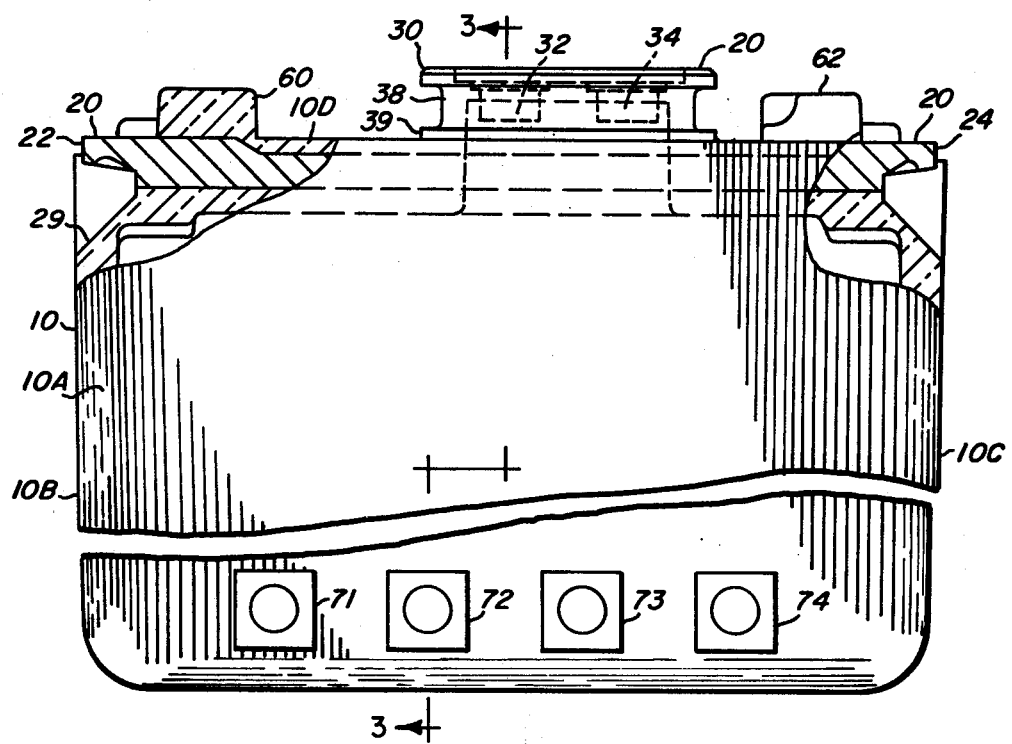
FIG. 2 is a front view of the battery device of FIG. 1.

FIG. 2 is a view of the front of the portable battery device of the invention including a cutaway view of portions of the upper regions of such battery device. The cutaway view is used to more clearly show the spatial relationship between battery housing 10 and interconnecting structure 20. It is noted that battery contacts 71, 72, 73 and 74 are situated on surface 10A of battery housing 10. Battery contacts 71–74 are operatively electrically coupled to the electrical energy cells 50 situated within battery housing 10 such that these cells are conveniently electrically charged by applying appropriate electrical currents to contacts 71–74.

Figure 3:
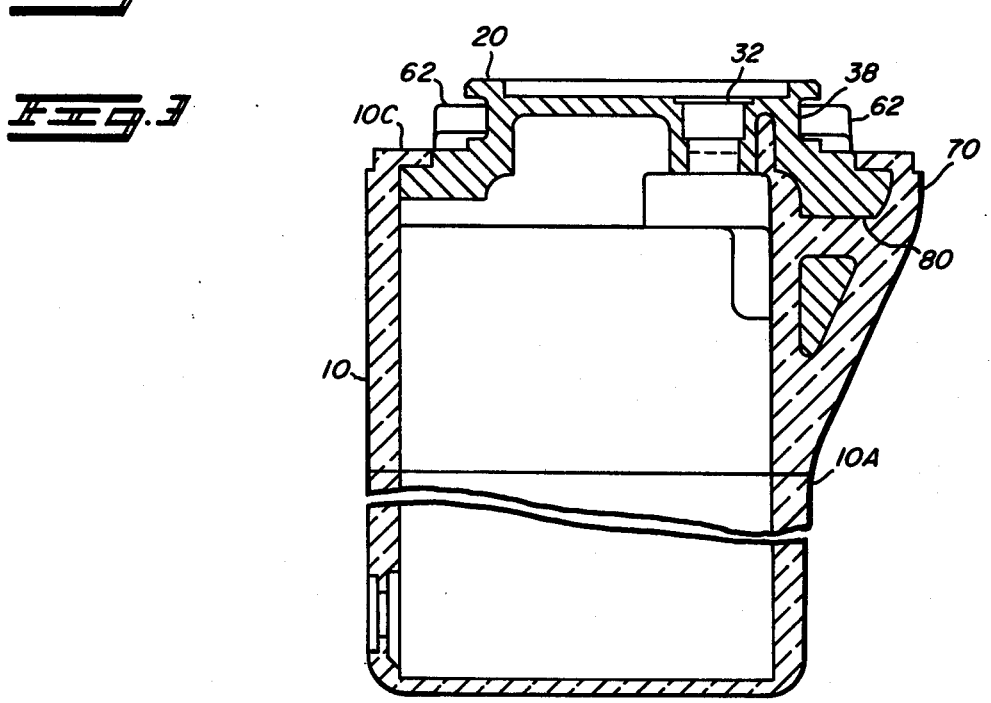
FIG. 3 is a cross-section of the battery device of FIG. 2 taken along line 3—3 of FIG. 2.

FIG. 3 is a cross-sectional view of the portable battery device depicted in FIG. 2 along a cross-section line 3-3. FIG. 3 depicts the spatial relationship between battery housing 10 and interconnecting structure 20. Interconnecting structure 20 includes a plurality of apertures 80 situated therein as shown in FIG. 3 and more clearly in the side view of the interconnecting structure 20 shown in FIG. 4. In the aforementioned second shot molding step wherein battery housing 10 is injection molded around interconnecting structure 20, the resilient molding material which forms battery housing 10 flows through apertures 80 to more securely bind interconnecting structure 20 to battery housing 10. The aforementioned plurality of apertures situated within interconnecting structure 20 are depicted in more detail in the front view of interconnecting structure 20 shown in FIG. 5.

FIG. 6 is a top view of interconnecting structure 20 prior to the second shot injection molding. A plurality of apertures 90, 91, 92, 93, 94 and 95 are situated in top surface 10D as shown in FIG. 6 such that during the second shot molding step the relatively low durometer housing material flows through apertures 90–95 in the course of forming housing 10. Housing 10 is thus more securely bound to interconnecting structure 20. FIG. 6 shows "O" ring type gasket 36 which protects electrical contacts 32 and 34 from moisture and water when the battery device of FIG. 6 is connected to an appropriate electrically energizable apparatus, such as the bottom of a portable radio device which is depicted in FIG. 7 for purposes of example.

The electrical energizable apparatus of FIG. 7 includes electrical contacts 102 and 104 which are recessed in a substantially rectangular chamber 110 below the bottom surface of the electrical energizable apparatus shown in FIG. 7. Latches or clamps 122 and 124 are respectively situated on the opposed side surfaces of the electrically energizable apparatus as shown in FIG. 7. Latches 122 and 124 are appropriately located on the apparatus so as to engage tabs 22 and 24, respectively of the portable battery device shown in FIG. 1. One type of latch which may be employed as latch 122 and 124 is depicted in FIG. 8 which shows an electrically energizable apparatus 120 with a latch 122. Latch 122 swings at pivots 123 and 125. A rigid metallic bar extends between pivots 123 and 125. The battery device-energizable apparatus illustrated in FIG. 8 shows latch 122 just starting to engage tab 22 of the battery device prior to the battery becoming fully latched to apparatus 120.

Figure 7:
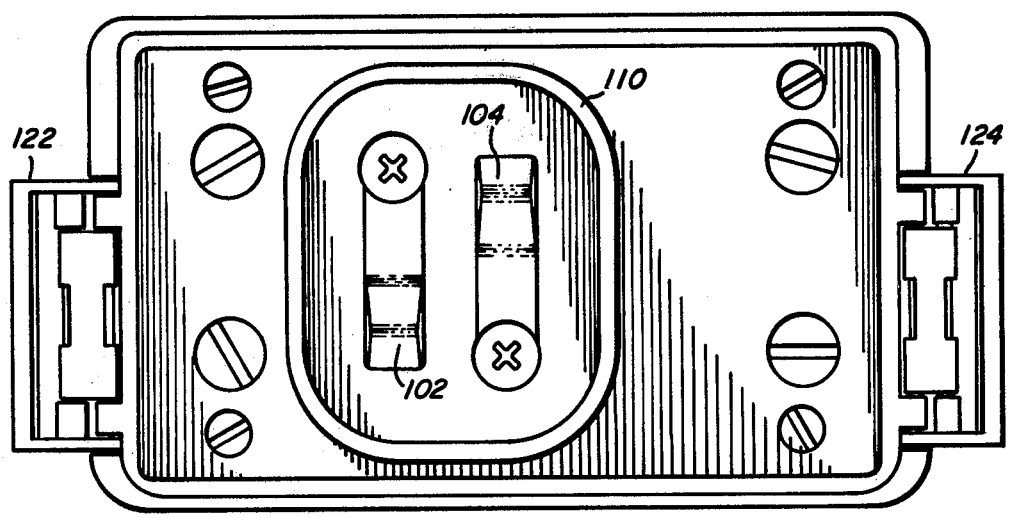
FIG. 7 is a bottom view of an electrically energizable apparatus which is conveniently attached to the portable battery device of FIG. 1.
Figure 8:
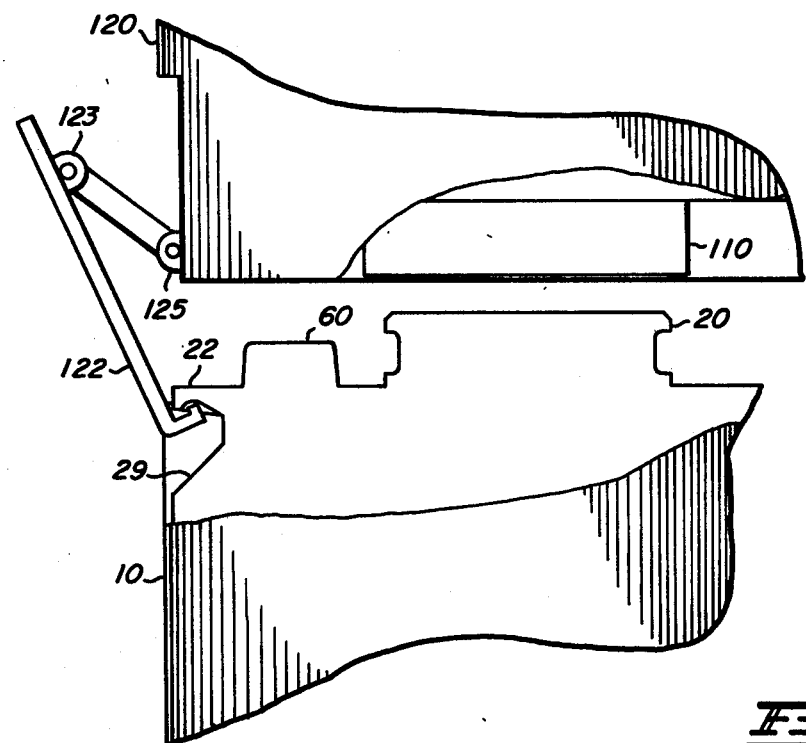
FIG. 8 is a representation of one clamping or latching apparatus which is employed to clamp the battery device of FIG. 1 to the electrically energizable apparatus of FIG. 7.

More specifically, when the battery device of FIG. 1 is mated with the electrically energizable apparatus shown in FIG. 7, protruding portion 30 of the battery device of FIG. 1 snuggly fits into recessed chamber 110 of the apparatus of FIG. 7. The "O" ring type gasket 36 contacts the inner surface of recessed portion 110 to provide a moisture and water seal. Clamps 122 and 124 respectively engage tabs 22 and 24 of FIG. 1 to firmly hold the battery of FIG. 1 to the apparatus of FIG. 7. As clamps 122 and 124 engage tabs 22 and 24, the battery of FIG. 1 is pulled towards the apparatus of FIG. 7 until clamps 122 and 124 are locked in position. During this clamping operation, guide members 60 and 62 provide the spring force necessary to load latches 122 and 124. Guide members 60 and 62 act to take up any tolerances in the fit between the battery device of FIG. 1 and the apparatus of FIG. 7. When the battery device of FIG. 1 is fully latched to the electrically energizable apparatus of FIG. 7, battery contacts 32 and 34 are electrically coupled to the electrical contacts 102 and 104 of the apparatus of FIG. 7.

The foregoing describes a portable battery device which is capable of absorbing relatively large amounts of shock. Such battery device protects an electrically energizable apparatus attached thereto from shocks which would otherwise be transmitted to the apparatus when the battery is subjected to an impact. The battery housing is sufficiently resilient to dampen shock while the interconnecting structure exhibits sufficient rigidity to mechanically and electrically interconnect the battery housing to the electrically energizable apparatus.

While only certain preferred features of the invention have been shown by way of illustration, many modifications and changes will occur to those skilled in the art. It is, therefore, to be understood that the present claims are intended to cover all such modifications and changes as fall within the true spirit of the invention.

What is claimed is:

1. A portable battery device for coupling to an electrically energizable apparatus comprising:
   housing means of resilient material for containing at least one electrical energy cell therein;
   interconnecting means of rigid material, situated substantially within and extending without said housing means, for mechanically connecting said housing means to said electrically energizable apparatus, and
   electrical contact means, operatively coupled to said at least one electrical energy cell and being situated on said interconnecting means, for providing electrical coupling of said at least one energy cell to said electrically energizable apparatus,
   whereby said portable battery device absorbs shock in a non-destructive manner when subjected to impact.

2. The portable battery device of claim 1 wherein said interconnecting means includes tab means, having opposed ends extending without said housing means through respective apertures therein, for being engaged by clamping apparatus to hold said portable battery device securely to said electrically energizable apparatus.

3. The portable battery device of claim 1 wherein said interconnecting means includes a protruding portion situated extending from within said housing means through an aperture in said housing means to without said housing means.

4. The portable battery device of claim 2 wherein said interconnecting means includes a protruding portion situated extending from within said housing means through an aperture in said housing means to without said housing means.

5. The portable battery device of claim 3 wherein said electrical contact means is situated within the protruding portion of said interconnecting means.

6. The portable battery device of claim 2 wherein said housing means is injection molded around said interconnecting means to form said housing means and the respective apertures therein.

7. The portable battery device of claim 3 wherein said housing means is injection molded around said interconnecting means to form said housing means and the respective apertures therein.

8. The portable battery device of claim 1 wherein said housing means is comprised substantially of elastomeric polyurethane material.

9. The portable battery device of claim 2 wherein said housing means is comprised substantially of elastomeric polyurethane material.

10. The portable battery device of claim 1 wherein said interconnecting means is comprised substantially of rigid polyester material.

11. A portable battery device for coupling to an electrically energizable apparatus comprising:
    housing means of resilient material for containing at least one electrical energy cell therein;
    interconnecting means of rigid material, situated within said housing means and including a protruding portion extending without said housing means through a first aperture in said housing means, for mechanically connecting said housing means to said electrically energizable apparatus, and
    electrical contact means, operatively coupled to said at least one energy cell and being situated on said protruding portion for providing electrical coupling of said at least one energy cell to said electrically energizable apparatus,
    whereby said portable battery device absorbs shock in a non-destructive manner when subjected to impact.

12. The portable battery device of claim 11 wherein said interconnecting means includes tab means having opposed ends extending without said housing means through respective second and third apertures therein, for being engaged by clamping apparatus to hold said portable battery device securely to said electrically energizable apparatus.

13. The portable battery device of claim 11 wherein said housing means is injection molded around said interconnecting means to form said first aperture.

14. The portable battery device of claim 12 wherein said housing means is injection molded around said interconnecting means to form said first, second and third apertures.

15. The portable battery device of claim 11 wherein said housing means is comprised substantially of elastomeric polyuretane material.

16. The portable battery device of claim 11 wherein said interconnecting means is comprised substantially of rigid polyester material.

17. The portable battery device of claim 12 wherein said interconnecting means is comprised substantially of rigid polyester material.

* * * * *